United States Patent
Lofgren et al.

(10) Patent No.: US 7,653,807 B2
(45) Date of Patent: Jan. 26, 2010

(54) REMOVING A PIPELINE BUBBLE BY BLOCKING CLOCK SIGNAL TO DOWNSTREAM STAGE WHEN DOWNSTREAM STAGE CONTAINS INVALID DATA

(75) Inventors: John D. Lofgren, Orlando, FL (US); Brett Kobernat, Orlando, FL (US)

(73) Assignee: Synopsys, Inc., Mountain View, CA (US)

( * ) Notice: Subject to any disclaimer, the term of this patent is extended or adjusted under 35 U.S.C. 154(b) by 494 days.

(21) Appl. No.: 11/231,111

(22) Filed: Sep. 19, 2005

(65) Prior Publication Data

US 2007/0067608 A1  Mar. 22, 2007

(51) Int. Cl.
  *G06F 9/30* (2006.01)
(52) U.S. Cl. ..................................................... 712/219
(58) Field of Classification Search .................. 712/219
  See application file for complete search history.

(56) References Cited

U.S. PATENT DOCUMENTS 5,019,967 A * 5/1991 Wheeler et al. ............. 712/219
5,325,495 A * 6/1994 McLellan ................... 712/219
5,490,255 A * 2/1996 Rawlinson et al. .......... 712/219

OTHER PUBLICATIONS

Tanenbaum, Andrew S., Structured Computer Organization, Second Edition, Prentice-Hall, Inc., 1984, pp. 10-12.*

* cited by examiner

*Primary Examiner*—Richard Ellis
(74) *Attorney, Agent, or Firm*—Park, Vaughan & Fleming, LLP (57) ABSTRACT

One embodiment of the present invention provides a system that removes a bubble from a pipeline. During operation, the system first detects a stall in the pipeline. The system next determines whether a first register contains invalid data, which is associated with a bubble. Next, the system determines whether a second register contains valid data, wherein the second register is adjacent to and upstream from the first register. If the first register contains invalid data and the second register contains valid data, the system replaces the invalid data of the first register with valid data based on the valid data in the second register without propagating the invalid data to a downstream register. As a result, the system removes the invalid data from the pipeline.

12 Claims, 8 Drawing Sheets

REMOVING A PIPELINE BUBBLE BY BLOCKING CLOCK SIGNAL TO DOWNSTREAM STAGE WHEN DOWNSTREAM STAGE CONTAINS INVALID DATA

BACKGROUND

1. Field of the Invention

The present invention relates to the field of logic design for integrated circuits (ICs). More specifically, the present invention relates to a method and an apparatus for removing a pipeline bubble from an execution pipeline.

2. Related Art

Application-Specific Integrated Circuits (ASICs) are quite popular because they facilitate rapid prototyping of new IC chips to satisfy specific customer needs. This rapid prototyping is typically accomplished by interconnecting existing IC building blocks or "standard-cells" within an ASIC to obtain required functionality for specific applications.

As feature sizes continue to shrink and as design tools continue to improve, the complexity of ASICs has grown from ~5000 gates per chip to over 100 million gates per chip. This allows extremely complex functionality to be integrated into a single ASIC chip.

A common structure within ASIC designs is a pipeline datapath, which comprises a series of consecutive pipeline stages. A stream of data entering from one end of the pipeline propagates through each pipeline stage and eventually emerges from the other end of the pipeline. During this process, each pipeline stage performs a specific operation on the data passing through it.

After each pipeline stage, a pipeline register stores a resulting data value for the next pipeline stage. The pipeline registers are generally coupled to a common clock signal, so that data in the pipeline advances from one pipeline stage to the next in lock-step under control of the clock signal.

A pipeline typically contains a continuous sequence of valid data items. However, if the pipeline encounters an input data stream which contains gaps, for instance a gap due to an idle time between two consecutive values on data inputs, invalid data is inserted in the pipeline. These gaps containing invalid data are commonly referred to as "pipeline bubbles". Once created, in prior art a pipeline bubble travels along with valid data through the pipeline. Pipeline bubbles are undesirable because they increase data latency and prevent the system from achieving the maximum possible throughput through the pipeline.

Previous techniques to remove pipeline bubbles typically involve adding additional logic between the pipeline stages. One such technique is to insert a data multiplexer (DMUX) before each pipeline register, so that, at each clock cycle, the data within the register may either be advanced to next stage or recirculated back through the DMUX. In doing so, each data item in the pipeline can be independently controlled and manipulated to facilitate removal of a pipeline bubble. However, this technique not only requires changing the pipeline architecture, which can add a significant amount of additional area to the ASIC, but also reduces the maximum possible clock rate, critically compromising performance.

Hence, what is needed is a method and an apparatus for removing pipeline bubbles without significantly affecting the architecture of the pipeline.

SUMMARY

One embodiment of the present invention provides a system that removes a bubble from a pipeline. During operation, the system first detects a stall in the pipeline. The system next determines whether a first register contains invalid data, which is associated with a bubble. Next, the system determines whether a second register contains valid data, wherein the second register is adjacent to and upstream from the first register. If the first register contains invalid data and the second register contains valid data, the system replaces the invalid data of the first register with valid data produced from the valid data in the second register without propagating the invalid data to a downstream register. As a result, the system removes the invalid data from the pipeline.

In a variation on this embodiment, the system detects the stall in the pipeline by determining if a downstream memory device, such as, a First-In, First-Out (FIFO) buffer, is full.

In a variation on this embodiment, removing the bubble reduces latency of the pipeline and converts the pipeline into a FIFO like storage device.

In a variation on this embodiment, the system can save power by preventing bubbles from consuming switching power while propagating through the pipeline.

In a variation on this embodiment, the system prevents bubbles from propagating through the pipeline by manipulating clock signals to the registers.

In another embodiment of the present invention, the system generates a circuit which automatically removes pipeline bubbles. In this embodiment, the system first receives a pipeline netlist. Next, the system extracts a register order from the pipeline netlist, which describes the order in which the registers are coupled with each other. Then, the system synthesizes a bubble-removal circuit based on the register order. Next, the system stitches the bubble-removal circuit to the pipeline to produce a combined circuit which is capable of removing bubbles from the pipeline. Note that stitching the bubble-removal circuit to the pipeline does not require changing the pipeline architecture.

In a variation on this embodiment, the bubble-removal circuit provides independent control of a register clock signal. During operation, the bubble-removal circuit receives a register clock associated with a register. The bubble-removal circuit also receives (1) a memory-full signal which indicates that a downstream memory is full and (2) a data-valid signal for a register, which indicates that the register is associated with a pipeline bubble. Next, the bubble-removal circuit generates a clock-enable signal for the register based on the data-valid signal and the memory full signal. The bubble-removal circuit then gates the register clock signal based on the clock-enable signal.

In a variation on this embodiment, while stitching the bubble-removal circuit to the pipeline, the system first receives a specification for the bubble-removal circuit. Next, the system identifies the clock-enable signal in the bubble-removal circuit and the corresponding register in the pipeline. The system then disconnects the clock signal from the register. Next, the system couples the clock-enable signal and the clock signal to the inputs of a clock gate. The system then couples the output of the clock gate to the register. In this way, the system controls the data propagation into the register by gating the clock signal based on the clock-enable signal.

In a variation on this embodiment, the combined circuit saves power by not clocking a register in a stalled pipeline if: the register's adjacent upstream register contains invalid data; or if the register contains valid data and there is no downstream bubble in the pipeline after the register.

DETAILED DESCRIPTION

Integrated Circuit Design Flow

Figure 1:
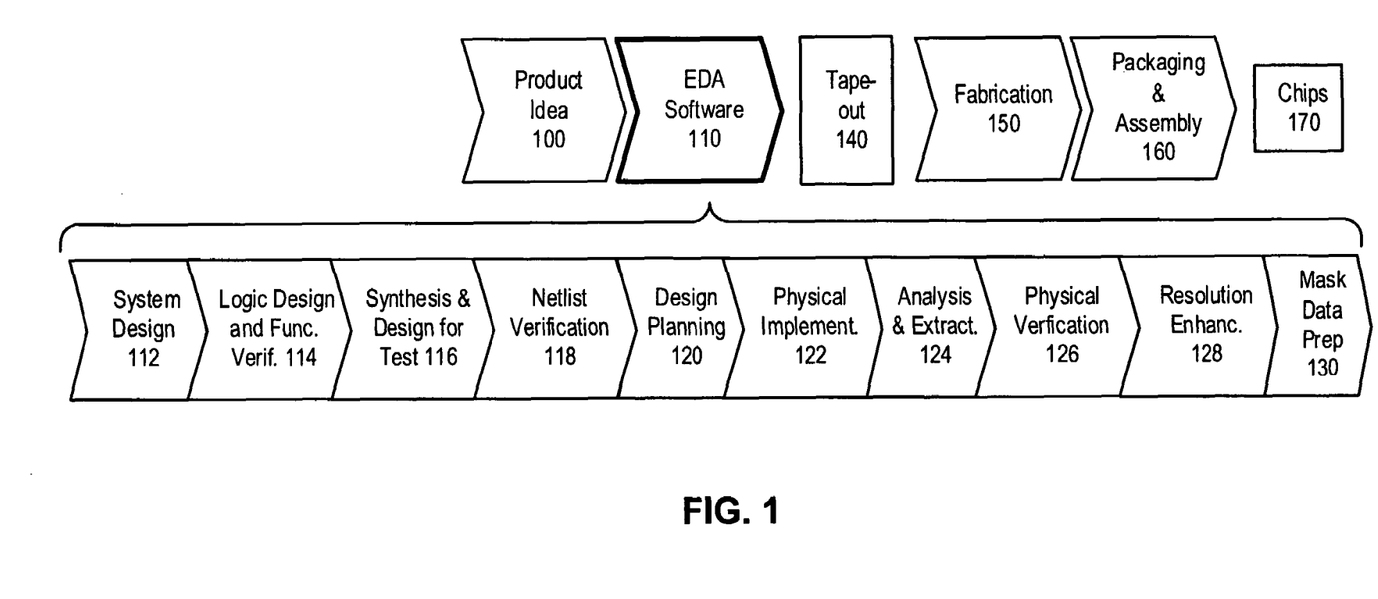
FIG. 1 illustrates an exemplary integrated circuit design flow in accordance with an embodiment of the present invention.

FIG. 1 illustrates an exemplary integrated circuit design flow in accordance with an embodiment of the present invention.

The process starts with the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. Specifically, this description is not meant to limit the present invention. For example, an actual integrated circuit design may require the designer to perform the design steps in a different sequence than the sequence described below. The following text provides a brief description of the steps in the design process (step 110).

System design (step 112): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks for lithographic use to produce finished chips. Exemplary EDA software products from Synopsys, Inc. that can be used at this step include the CATS(R) family of products.

Note that embodiments of the present invention can be used during one or more of the above described steps. Specifically, one embodiment of the present invention can be used during the system design step 112, logic design and functional verification step 114, and synthesis and design for test step 116.

A Pipeline Structure

Figure 2:
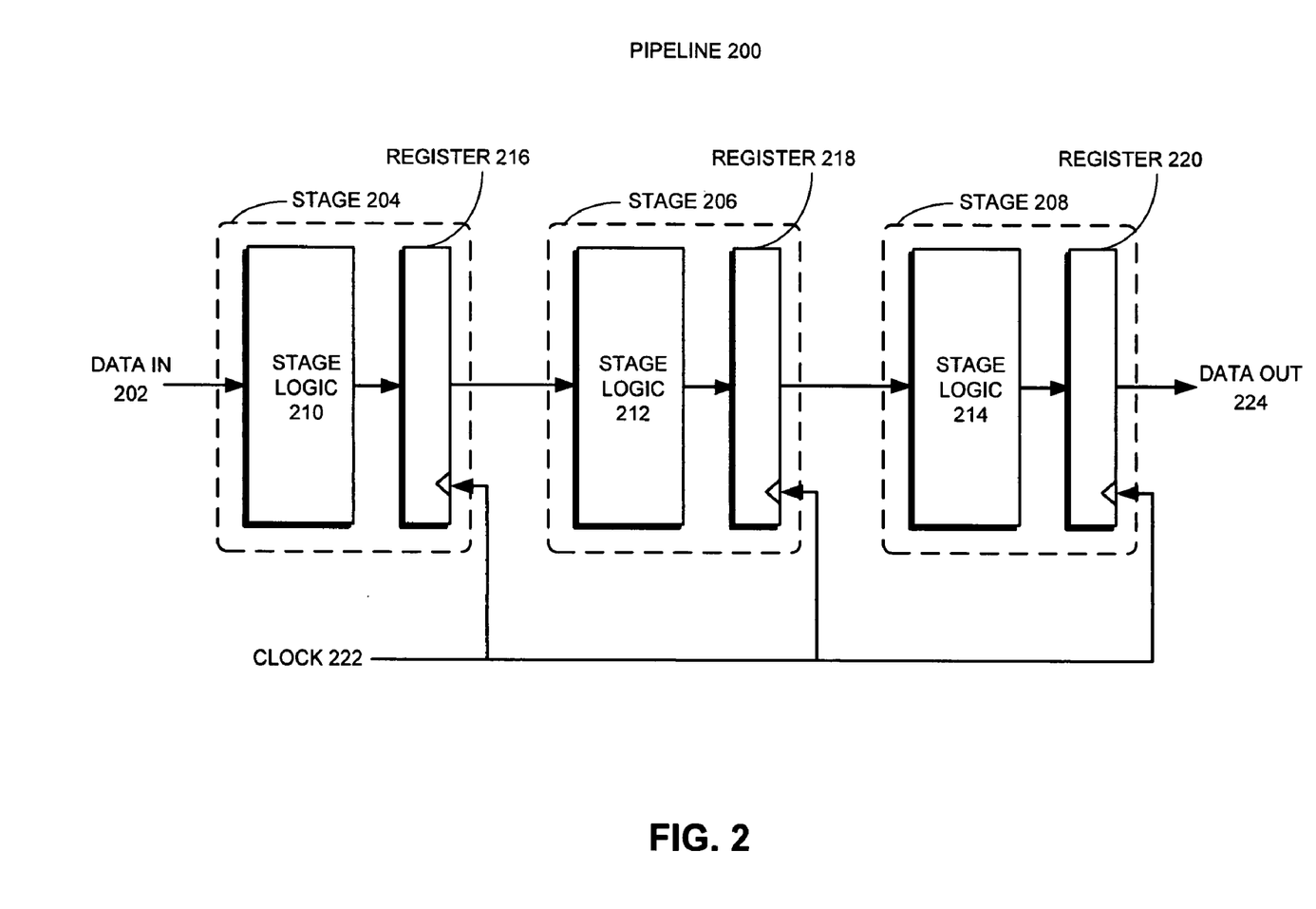
FIG. 2 illustrates an exemplary pipeline structure comprising three pipeline stages in accordance with an embodiment of the present invention.

FIG. 2 illustrates an exemplary pipeline datpath 200 comprising three pipeline stages in accordance with an embodiment of the present invention. Note that a specific pipeline can include more or fewer stages than are shown and described herein. The three pipeline stages are coupled in series from left to right. During operation, data 202 enters the pipeline 200 from stage 204 on the left, and moves sequentially to the right through stages 206 and 208. Conventionally, a stage to the right is referred to as "downstream" and a stage to the left is referred to as "upstream." Note that, data generally propagates from upstream to downstream, but there can be data feedback loops in the pipeline, as in a case of a pipelined accumulator.

Each pipeline stage includes stage logic and a register, which are coupled to each other. For example, pipeline stage 204 includes stage logic 210 which is coupled to register 216; pipeline stage 206 includes stage logic 212 which is coupled to register 218; and pipeline stage 208 includes stage logic 214 which is coupled to register 220. Each stage logic unit performs functions on the data passing through it. Each register following the stage logic stores resulting data from the stage logic at the end of each clock cycle. Note that registers 216, 218, and 220 are coupled to a common clock signal 222, which determines when the resulting data from the stage logic is stored into the register. Successive clock transitions cause the register data to move downstream in "lock-step". Finally, pipeline 200 produces output data 224 from the final stage 208.

Pipeline Stalls

Pipeline structures are typically used in ASIC designs to perform high-speed computations on large amounts of streaming data, e.g., video data, audio data, voice data or digital images. Commonly, the output of an ASIC pipeline is coupled to a First-In First-Out (FIFO) memory which receives data from the pipeline and temporarily stores the data for processing further downstream. Often times multiple pipelines can merge onto a same downstream FIFO. The downstream FIFO can become full, which then stops the upstream pipelines from outputting data to its input. Consequently, the data in the upstream pipelines stop moving forward and starts backing up. This causes a "stall" in the upstream pipelines.

Bubble Removal in a Stalled Pipeline

Pipeline bubbles can be removed by moving valid data forward into registers which contain invalid data while preventing the invalid data from propagating. This is typically not possible during unimpeded operation of the pipeline when all of the data in the pipeline advances synchronously. However, in a stalled pipeline, data propagation is interrupted. In this case, both valid data and invalid data are kept in the registers waiting for the stall condition to clear. It would be beneficial to utilize this time to move the valid data into the locations occupied by bubbles so that the invalid data can be replaced with valid data, thereby removing the bubbles from the pipeline.

Figure 3:
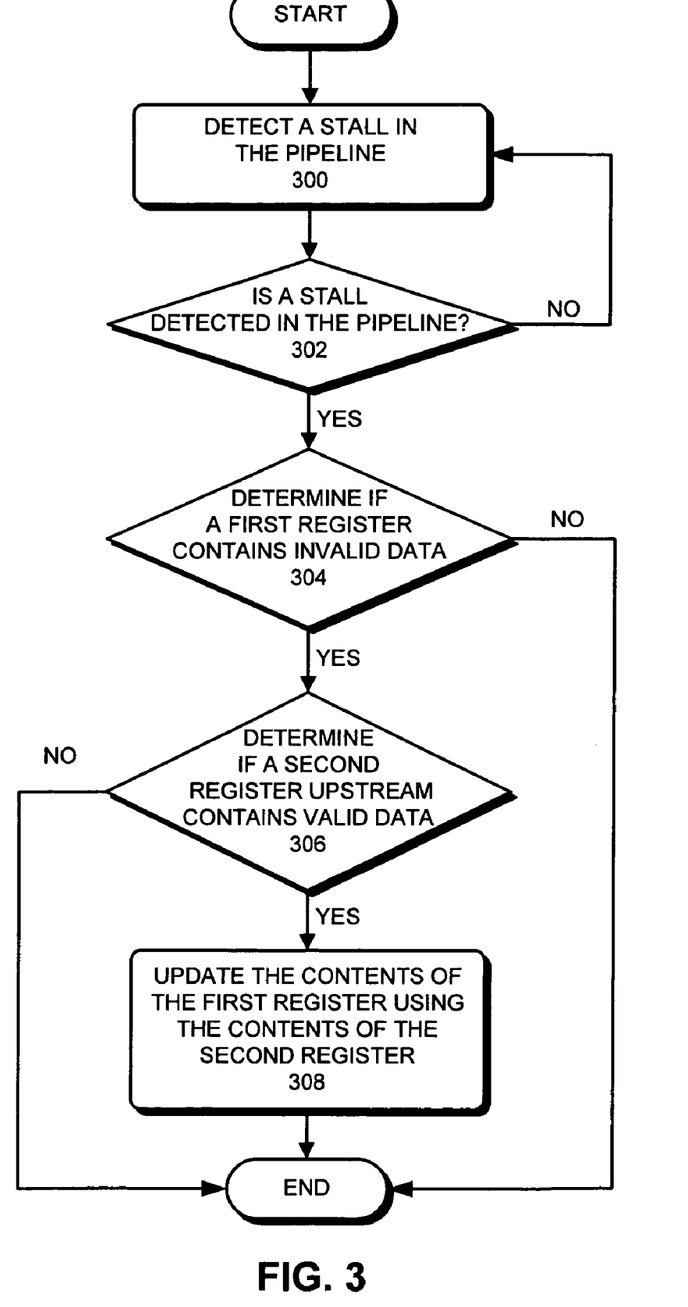
FIG. 3 presents a flowchart illustrating the process of removing a bubble from a stalled pipeline in accordance with an embodiment of the present invention.

FIG. 3 presents a flowchart illustrating the process of removing a bubble in a stalled pipeline in accordance with an embodiment of the present invention. The process typically begins with detecting if there is a stall in the pipeline (step 300). A stall may be caused by any one of the reasons described previously. If a stall is not found in step 300, the process keeps monitoring a stall in the pipeline (step 302).

When a stall condition is identified, the bubble-removal logic next determines if there are bubbles in the stalled pipeline and if the configuration of the data allows the bubbles to be removed. Note that, in order to implement bubble-removal logic, the registers can no longer be coupled to a common clock signal. In other words, the contents of the registers can no longer be moved in "lock-step". Instead, each register clock is controlled independently using a dedicated control circuit, which determines whether or not the contents of that register should propagate during the next clock cycle. In one embodiment of the present invention, if a register is determined to be associated with a bubble, the contents of the register are not allowed to propagate to the next pipeline stage. The clock control for the bubble-removal logic will be discussed later.

Since each register has a dedicated clock control circuit, the bubble removal can be accomplished by manipulating each register's contents independent of other registers. In doing so, the process first determines whether a first register in the pipeline contains invalid data (step 304). If so, it is associated with a bubble. Note that a bubble may comprise one or more consecutive registers containing invalid data. However, bubble-removal logic is activated independently for each register associated with the bubble, instead of for the entire bubble.

The process next determines whether a second register, which is adjacent to and upstream from the first register, contains valid data (step 306). If the first register contains invalid data and the second register contains valid data, the bubble-removal from the first register is validated.

When the bubble-removal is validated, the bubble-removal process replaces the invalid data in the first register with valid data produced from the valid data in the second register (step 308). Specifically, the valid data in the second register is processed by the next downstream stage logic and the output of the stage logic is stored into the first register. At the end of this process, the first register contains valid data, which means that the bubble (or part of the bubble) has been removed from the pipeline.

Figure 4A:
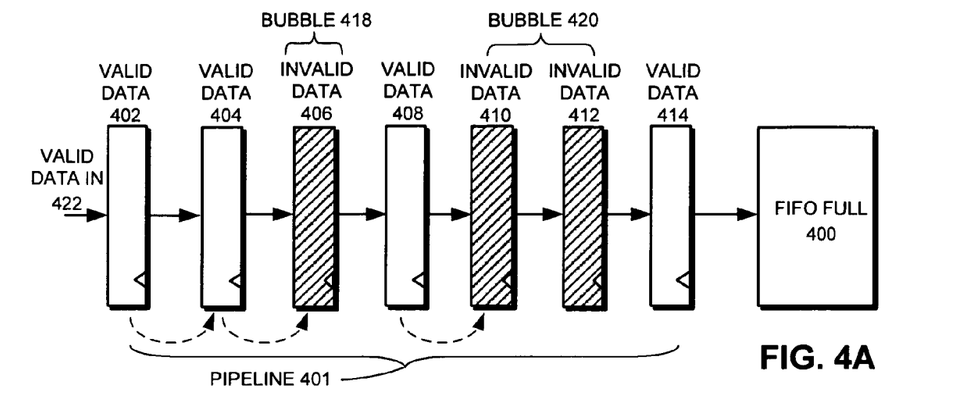
FIG. 4A illustrates a stalled pipeline containing bubbles in accordance with an embodiment of the present invention.
Figure 4B:
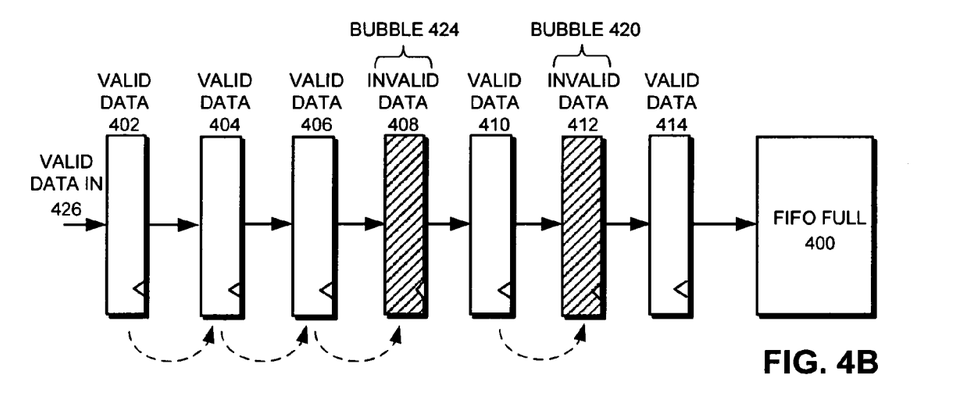
FIG. 4B illustrates the register state after a first bubble-removal step in accordance with an embodiment of the present invention.
Figure 4C:
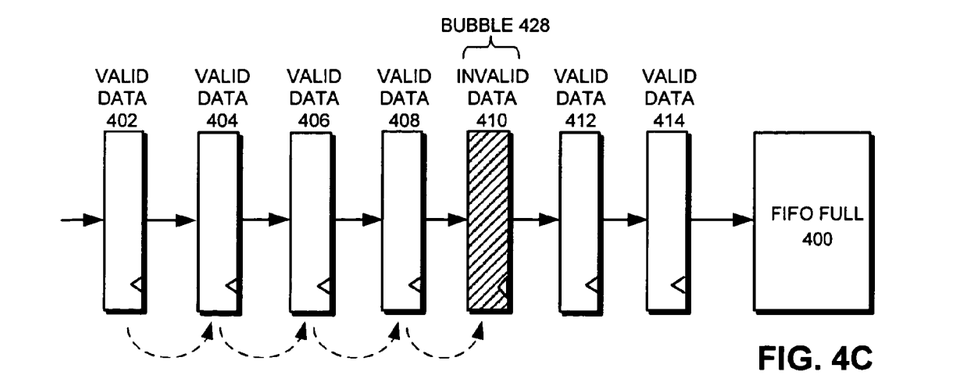
FIG. 4C illustrates the register state after a second bubble-removal step in accordance with an embodiment of the present invention.

FIGS. 4A-4C illustrate the bubble-removal process for a stalled pipeline containing two bubbles 418 and 420 in accordance with an embodiment of the present invention.

In particular, FIG. 4A illustrates a stalled pipeline containing bubbles in accordance with an embodiment of the present invention. In FIG. 4A, FIFO 400 is full which causes the pipeline 401, which merges onto it, to stall. Note that there are seven stages in pipeline 401. For illustration purposes, the stage logic before each register has been omitted so that FIG. 4A illustrates only the registers and interconnections between registers. Note that as a data item propagates from a first register to a second register, the data item passes through stage logic (not shown) which operates on the data, which typically alters the data before it is stored in the second register.

There are two bubbles in FIG. 4A: the first bubble 418 is in register 406 which contains invalid data; and the second bubble 420 is contained in adjacent registers 410 and 412, which both contain invalid data. Note that in FIG. 4A, register pairs 404/406 and 408/410 are both enabled for bubble-removal as described above.

The arrows on the bottom of each figure specify how data propagates when the next clock transition arrives. If there is no arrow from a register to the next downstream register, the register is either associated with a bubble, such as the registers 406, 410, and 412, or it is at the end of the pipeline, and is coupled to a full FIFO, such as register 414. In the example illustrated in FIG. 4A, only the contents of registers 402, 404, and 408 are allowed to propagate downstream at the next clock transition.

FIG. 4B illustrates the register state after a first bubble-removal step in accordance with an embodiment of the present invention. At a first clock transition, the contents of registers 406 and 410, which are associated with bubbles, are replaced with valid data which originates from registers 404, and 408. Consequently, bubble 418 is removed while bubble 420 is partially removed. Registers 402 and 404, which previously contained valid data, receive new valid data. More specifically, register 402 receives new valid data produced from the valid data 422 entering the pipeline 401, and register 404 receives new valid data produced from the valid data in register 402. Note that the contents of registers 408, 412, and 414 are not updated. Also note that register 408, which contained valid data before the first clock transition, now contains a new bubble 424 after the clock transition. This is because that the contents of register 408 are not updated because its upstream register 406 contains invalid data. This is further accomplished by preventing the clock from latching register 408, which will be described in more detail later on. After the first clock transition, the number of registers containing invalid data is reduced from 3 to 2. At this point, register pairs 406/408 and 410/412 are enabled for bubble-removal.

The arrows on the bottom of FIG. 4B specify how data propagates during a second clock transition. If there is no arrow from a register to the next downstream register, the register is either associated with a bubble, such as the registers 408, and 412, or it is at the end of the pipeline which is directly coupled to a full FIFO 400.

FIG. 4C illustrates the register state after a second bubble-removal step in accordance with an embodiment of the present invention. At the second clock transition, registers 408 and 412 (which are associated with bubbles) are replaced with valid data which originates from registers 406, and 410. Consequently, bubbles 420 and 424 are removed. Registers 402, 404, and 406, which previously contained valid data, receive new valid data produced from the valid data 426 entering the pipeline 401, and valid data in registers 402 and 404, respectively. The contents of registers 410 and 414 are not updated. Note that register 410 which contained valid data before the second clock transition, now contains a new bubble 428 after the second clock transition for the same reason described above. After the second clock transition, the number of registers containing invalid data is further reduced from 2 to 1. At this point, register pair 408/410 is enabled for the final bubble-removal operation.

During a third clock transition, all the bubbles in the pipeline are removed in the same manner as the first two clock transitions and the pipeline contains only valid data.

In the above description, it has been assumed that the stall condition persists before all the bubbles in the pipeline are removed. In another embodiment of the presently invention, the stall condition may be cleared before all the bubbles in a pipeline are removed. In this case, the bubbles in the pipeline are only partially removed before they exit the pipeline.

Bubble Removal Logic

Figure 5:
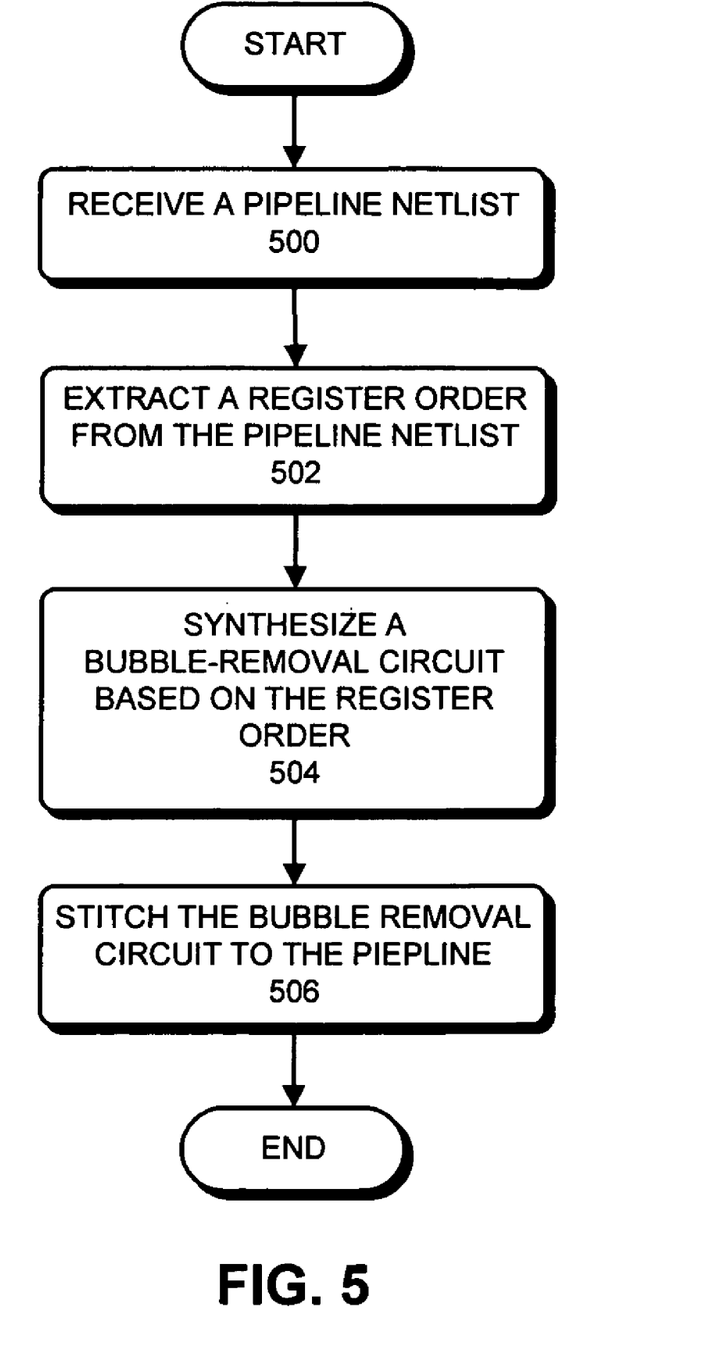
FIG. 5 presents a flowchart illustrating the process of generating bubble-removal logic for a pipeline in accordance with an embodiment of the present invention.

FIG. 5 presents a flowchart illustrating the process of generating bubble-removal logic for a pipeline in accordance with an embodiment of the present invention. The process typically begins upon receiving a pipeline netlist (step 500), which describes the interconnections of the pipeline stages and registers in the pipeline. Next, the process extracts a register order from the pipeline netlist (step 502), which describes the order in which the registers are coupled with one another. In this step, the process also determines the number of registers, that is, the number of stages in the pipeline. The process then synthesizes a bubble-removal circuit based on the extracted register order (step 504). Next, the process stitches the bubble-removal circuit to the pipeline to produce a combined circuit which is capable of removing bubbles in the pipeline (step 506). In the combined circuit, each register clock is individually controlled by the bubble-removal circuit, and the contents in the register are allowed to propagate only if the register satisfies specific control logic conditions. Note that stitching the bubble-removal circuit to the pipeline does not require changing the pipeline architecture. A detailed description of the bubble-removal circuit and combined circuit is provided below.

Figure 6:
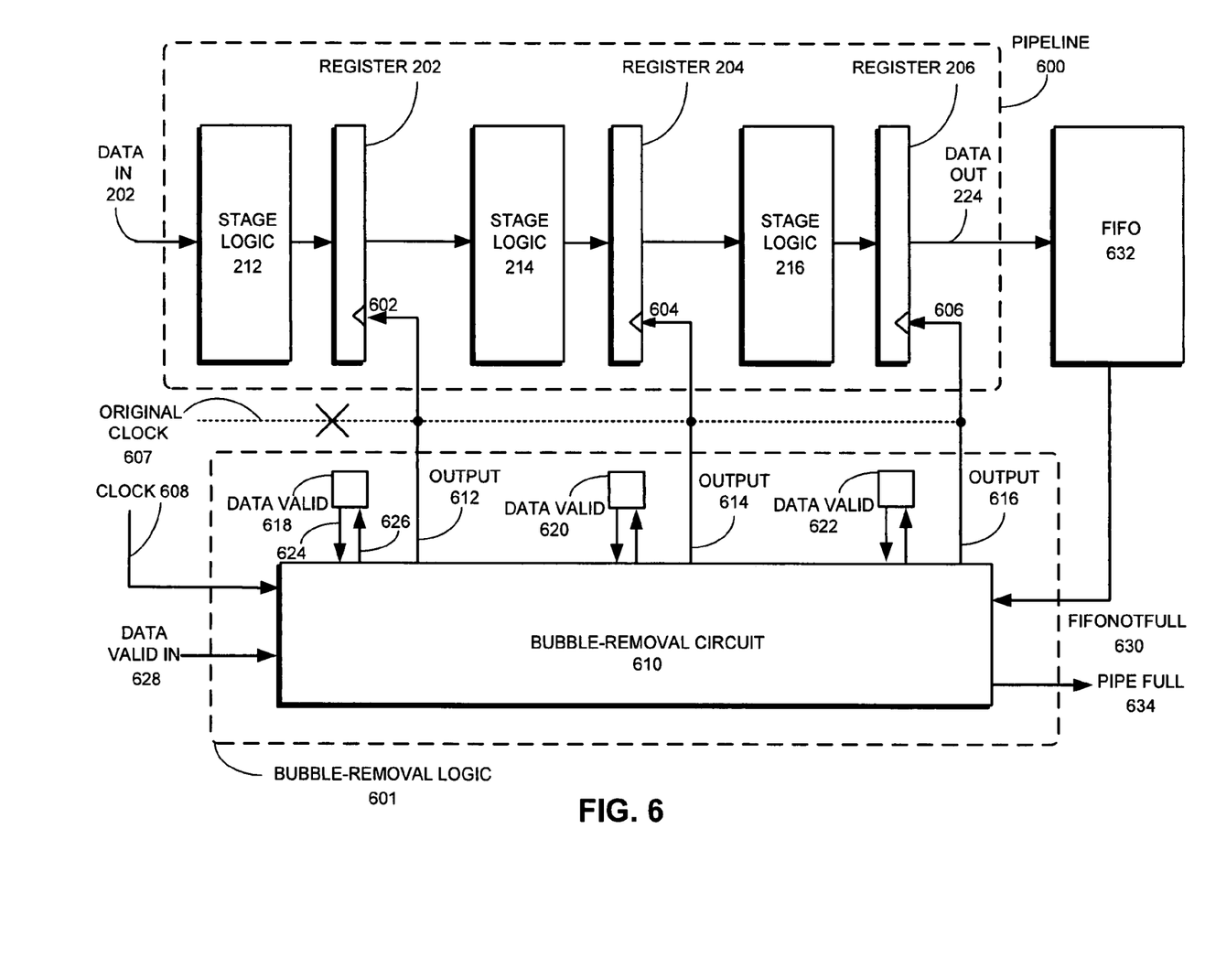
FIG. 6 illustrates a combined circuit comprising a pipeline and bubble-removal logic in accordance with an embodiment of the present invention.

FIG. 6 illustrates the combined circuit comprising a pipeline 600 and bubble-removal logic 601 in accordance with an embodiment of the present invention. Pipeline 600 has been previously described in FIG. 2, except that the register clocks 602, 604, and 606 are no longer coupled to the common clock signal as illustrated in FIG. 2. The dotted line 607 was the original clock signal for all the registers, which is now disconnected. Instead, the register clocks 602, 604, and 606 are coupled to bubble-removal circuit 610 via the outputs 612, 614, and 616 of the bubble-removal circuit 610, respectively.

The bubble-removal circuit 610 also provides each register in the pipeline 600 with a corresponding data-valid bit, which indicates whether the contents of the registers are valid. During each clock cycle, bubble-removal circuit 610 retrieves data-valid bits 618, 620, and 622, and uses these to produce clock control signals and new data-valid bits for the next clock cycle via signal path 624. The bubble-removal circuit then updates the data-valid bits at the beginning of the next clock cycle via signal path 626.

Bubble-removal circuit 610 has three inputs: (1) the clock signal 608; (2) data-valid input 628, which is the data-valid bit for new data entering first register 212 of the pipeline 600; and (3) FIFONOTFULL bit 630 from FIFO 632, which indicates whether FIFO 632 is full. Note that FIFO 632 is not part of the combined circuit, but shown for illustration purpose. An additional output from the bubble-removal circuit 600 is "pipe full" 634 which indicates a condition where the pipeline 600 is bubble-free while the stall condition caused by a full FIFO persists. Note that the coupling between the bubble-removal circuit and the pipeline are conveniently established through control outputs 612, 614, and 616. Furthermore, note that the bubble-removal circuit can be conveniently sized up or down based on the number of stages determined from a given pipeline netlist.

Figure 7:
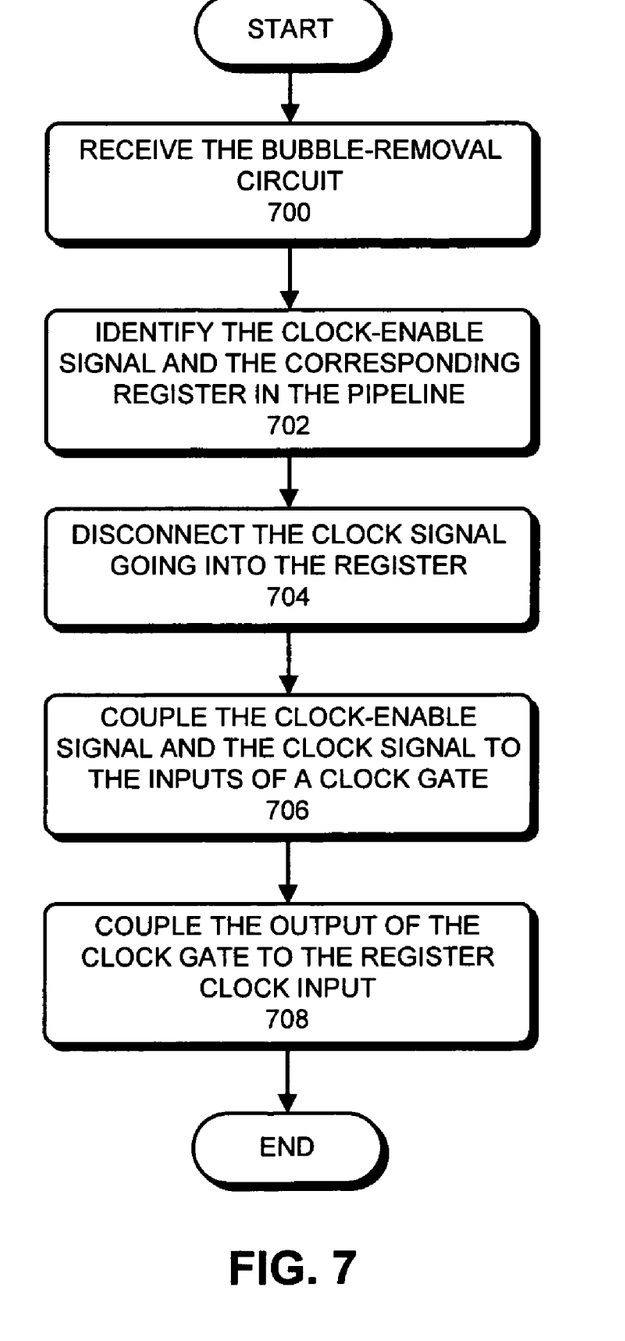
FIG. 7 presents a flowchart illustrating the process of stitching a bubble-removal circuit to a pipeline to produce a combined circuit in accordance with an embodiment of the present invention.

FIG. 7 presents a flowchart illustrating the process of stitching a bubble-removal circuit to a pipeline to produce a combined circuit in accordance with an embodiment of the present invention.

The process typically begins upon receiving a specification for the bubble-removal circuit which has been synthesized for a specific pipeline (step 700). Next, the process identifies a clock-enable signal from the bubble-removal circuit and also the corresponding register in the pipeline (step 702). The process then disconnects the register's clock signal (step 704) and couples both the clock-enable signal and the clock signal to the inputs of a clock gate (step 706). Finally, the process couples the output of the clock gate to the register clock input (step 708). This process is repeated for all stages in the pipeline.

Figure 8:
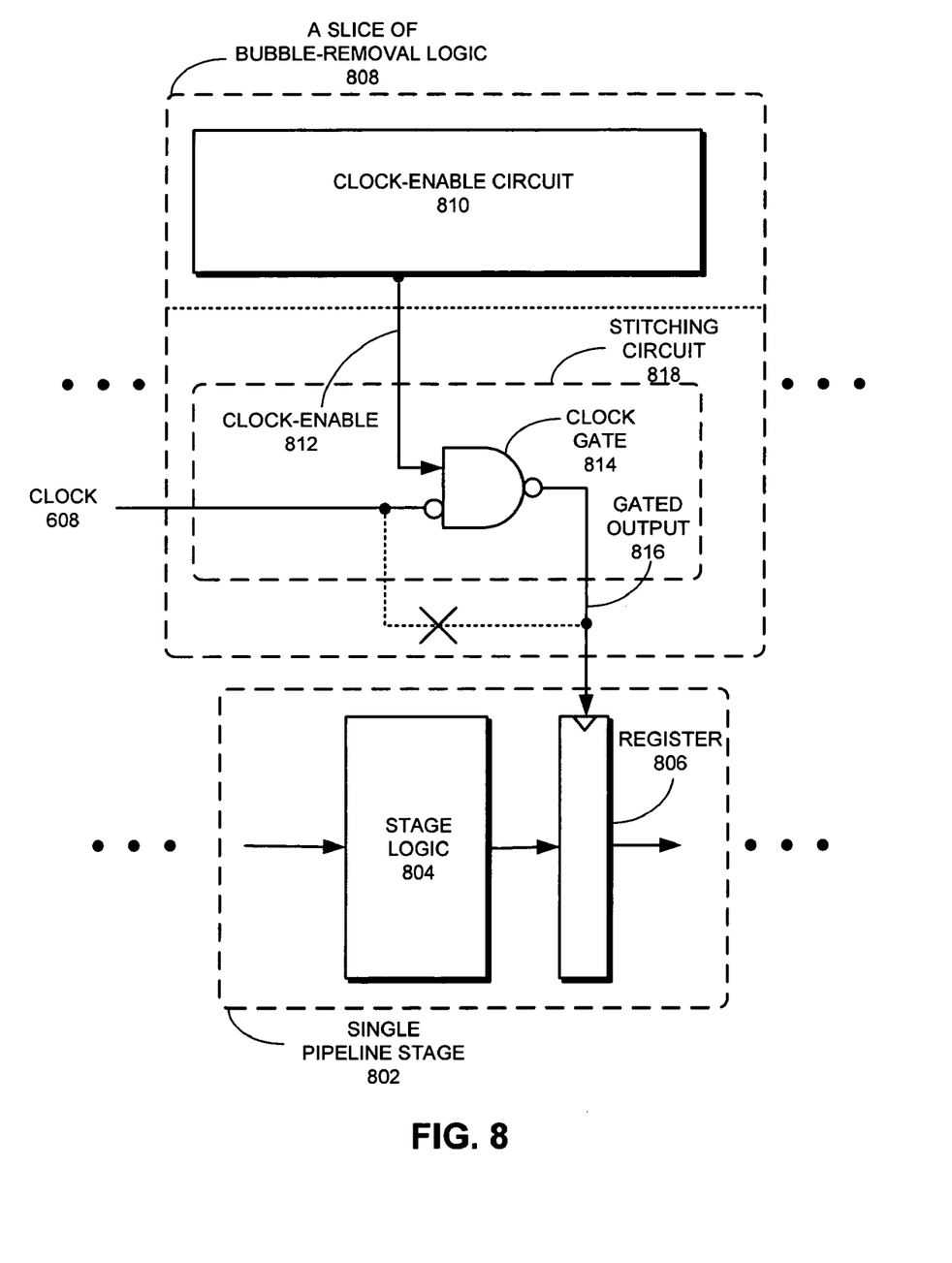
FIG. 8 illustrates a slice of a combined circuit which illustrates stitching of the two components by using a clock gate in accordance with an embodiment of the present invention.

FIG. 8 illustrates a slice of the combined circuit illustrating the stitching of two components of the combined circuit by using a clock gate in accordance with an embodiment of the present invention. The slice contains a pipeline stage 802 (which further comprises stage logic 804 and register 806) and its corresponding bubble-removal circuit 808. Within the slice of bubble-removal circuit 808, a clock-enable circuit 810 generates a clock-enable signal 812 for register 806 based on the data-valid bits of all the registers in the pipeline as well as FIFONOTFULL bit. Clock-enable signal 812 is then coupled to an input of a clock gate 814. In one embodiment of the present invention, clock gate 814 is a two-input NAND gate. It will be apparent to one skilled in the art that many other types of logic can be used as clock gate 814. Note that clock signal 608 is now coupled to a second input of clock gate 814, and therefore becomes a gated clock. This gated clock signal 608 can be "turned on/off" depending on the clock-enable signal 812. The gated output 816 is coupled to the clock input of register 806. In the embodiment illustrated in FIG. 8, the clock signal 608 passes through the clock gate 814 to register 806, that is, enabled only if the clock-enable signal 812 is set to 1. When the clock is enabled, the contents of register 806 are allowed to propagate downstream upon the next clock transition.

Using clock gate 814 in this way is similar to a stitching mechanism, because it interconnects clock-enable circuit 810 and pipeline stage 802 so that the interconnection can be easily established or removed using a signal bit (clock-enable 812) and a signal gate (clock gate 814). Furthermore, this stitching configuration can be conveniently scaled up by adding one stitching circuit 818 for each additional pipeline stage, or scaled down by remove one stitching circuit 818 to produce a smaller pipeline.

Table 1 illustrates a segment of Verilog Register Transfer Level (RTL) code describing the clock-enable circuit 810 for a specific pipeline register. The number of stages in the pipeline is assigned to constant STAGES. Variable array clkEn[j] contains the clock-enable bits for all of the registers, which is STAGES bits long. Note that the index variable j is associated with the Nth stage of the pipeline by equation:

$$N = STAGES + 1 - j,$$

so the first stage of the pipeline from the left corresponds to j=STAGES, or N=1.

Two other important variable arrays in Table 1 are registers data Valid[j] and wires pre Valid[j], where j is described in paragraph [0068]. The first one contains data-valid bits for all the registers during the current clock cycle, while the second one is the pre-computed register states for the next clock cycle.

In the expression:

$$clkEn[j] = reset \| (dataValid[j+1] \&\& ((\sim fifoFull) \| (\sim \&dataValid[j:1]))),$$

the clock-enable bit clkEn[j] for stage j is set to 1 (or enabled) if any one of the following conditions is true: (1) the circuit is reset; (2) the adjacent upstream register contains valid data, and any one of the downstream registers is associated with a bubble; or (3) the adjacent upstream register contains valid data, while none of the downstream registers is associated with a bubble, and the downstream FIFO is not full. These are precisely the conditions for bubble-removal previously described.

In the expression for pre Valid[j]:

$$perValid[j] = \\ reset \| (dataValid[j+1] \&\& ((\sim fifoFull) \| (\sim \&dataValid[j:1]))) \\ \| (dataValid[j] \&\& \sim ((fifoFull) \| (\sim \&dataValid[j:1]))),$$

data-valid bit for register j is set to 1 (or valid) for the next clock cycle if any one of the following conditions is true: (1) the circuit is reset; (2) the adjacent upstream register contains valid data, and any one of the downstream registers is associated with a bubble; (3) the adjacent upstream register contains valid data, while none of the downstream register is associated with a bubble, and the downstream FIFO is not full; or (4) register j currently contains valid data and the downstream pipeline and FIFO are both full. The values of wire preValid[j] will be assigned to the corresponding register data Valid[j] after a next clock transition if the circuit is not in the "reset" state.

Power Saving Through Bubble Removal

Power consumption in a pipeline is mainly due to clocking of the registers in the pipeline. Specifically, the power is dissipated within a register during clock transitions through charging and discharging of the capacitors within or around the register, and much of the capacitance is in the clock wires which distribute the clock signal 608 through clock gate 814 to registers 806. In cases where propagating the contents of the register is not desired, the propagation may be interrupted by blocking the clock transitions to the register. Specifically, if a register is associated with a bubble, blocking the clock to the register prevents propagating the bubble. Consequently, power saving can be achieved when a register clock signal is blocked from entering a register by clock gating.

Bubble-removal logic achieves power saving in a pipeline by gating the clock signal in three ways: (1) during a stall condition in a pipeline, the bubble-removal circuit blocks the clock signal going into a register if the register's adjacent upstream register is associated with a bubble; (2) during a stall condition in a pipeline, the bubble-removal circuit blocks the clock signal going into a register that has valid data but there is no downstream bubble in the pipeline after the register; (3) during a non-stall condition, the bubble-removal circuit turns off the clock signals to the registers that are not receiving valid data. In the first and third cases, the invalid register contents are not allowed to propagate, which would otherwise consume power by advancing the invalid data; while in the second case, the bubble-removal circuit guarantees that the registers with stalled valid data do not get clocked, which would otherwise consume power without advancing the valid data.

Note that, in comparison to pipeline logic which does not stop the clock during a stall condition, and thereby allows power to continue dissipating in the registers and clock distribution wires, the present invention can achieve significant power savings. Note that, the amount of power savings is incrementally proportional to the amount of data that is moving downstream in a pipeline, which can be from 0 to 100%.

Furthermore, implementing bubble-removal logic facilitates removing the gaps between valid data in the pipeline, thereby reducing data latency and increasing data throughput. The bubble-removal logic can also serve as a monitoring mechanism, which continuously monitors for any new bubbles generated in the pipeline and enables them to be removed.

Finally, a pipeline with the bubble-removal logic in the present invention behaves like a FIFO, so the FIFOs associated with the pipeline may be reduced in size or even eliminated, as dictated by system design parameters.

CONCLUSION

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent. Additionally, the above disclosure is not intended to limit the present invention. The scope of the present invention is defined by the appended claims.

TABLE 1

```
'define STAGES 6
module bubbleRemove (clk, reset, clkEn, dataValidIn,
dataValidOut, fifoFull, pipeFull );
   input clk;
   input reset;
   input dataValidIn;
   input fifoFull;
   output    dataValidOut;
   output    pipeFull;
   reg       [('STAGES):1] dataValid;
   output    [('STAGES):1] clkEn;
   wire      [('STAGES):1] preValid;
   wire      dataValidInNet;
   assign    dataValidOut = dataValid[1];
   assign    pipeFull = fifoFull && (&dataValid['STAGES:1]) ;
   genvar j;
   generate
      for (j=1; j<='STAGES; j=j+1)
         begin : pipe_stages
            if (j != 'STAGES)
               begin
                  assign clkEn[j] = reset
                              || ( dataValid [j+1]    &&   ( (~fifoFull)
|| (~&dataValid[j:1]) )) ;
                  assign preValid[j] = reset
                              || ( dataValid[j+1]    &&   ( (~fifoFull)
|| (~&dataValid[j:1]) ))
                              || ( dataValid[j]      && ~( (~fifoFull)
|| (~&dataValid[j:1]) )) ;
               end
            else
               begin
                  assign clkEn[j] = reset
                              || ( dataValidIn       &&   ( (~fifoFull)
|| (~&dataValid[j:1]) ));
                  assign preValid[j] = reset
                              || ( dataValidIn       &&   ( (~fifoFull)
|| (~&dataValid[j:1]) ))
                              || ( dataValid[j]      && ~( (~fifoFull)
|| (~&dataValid[j:1]) )) ;
               end
            always @ (posedge clk)
               begin : middleBits
                  if (reset)
                     dataValid[j] <= #1 0 ;
                  else
                     dataValid[j] <= #1 preValid[j] ;
               end
         end
   endgenerate
endmodule
```

What is claimed is:

1. A method for removing a bubble from a pipeline, the method comprising:

detecting a stall in a pipeline, which comprises a first register, a pipeline stage, and a second register, wherein an output of the second register is coupled to an input of the pipeline stage, and an output of the pipeline stage is coupled to an input of the first register, and wherein the first register and the second register advance data whenever a clock signal is provided to them;

determining whether the first register contains invalid data;

determining whether the second register contains valid data; and during the stall, if the first register contains invalid data and the second register contains valid data, blocking the clock signal to the first register, which causes the invalid data in the first register to be replaced by valid data that is based in part on the valid data in the second register, wherein blocking the clock signal to the first register causes the first register to consume less power, thereby reducing the power consumption of the pipeline.

2. The method of claim 1, wherein detecting the stall in the pipeline involves determining if a downstream memory device, such as, a First-In, First-Out (FIFO) buffer, is full.

3. The method of claim 1, wherein removing the bubble reduces latency of the pipeline and converts the pipeline into a FIFO like storage device.

4. The method of claim 1, wherein the method can save power by preventing bubbles from consuming switching power while propagating through the pipeline.

5. The method of claim 4, wherein the method prevents bubbles from propagating through the pipeline by manipulating clock signals to the registers.

6. A computer-readable storage medium storing instructions that when executed by a computer cause the computer to perform a method for removing a bubble from a pipeline, wherein the computer-readable storage medium does not include computer instruction signals embodied in a transmission medium, the method comprising:

detecting a stall in a pipeline, which comprises a first register, a pipeline stage, and a second register, wherein an output of the second register is coupled to an input of the pipeline stage, and an output of the pipeline stage is coupled to an input of the first register, and wherein the first register and the second register advance data whenever a clock signal is provided to them;

determining whether the first register contains invalid data;

determining whether the second register contains valid data; and during the stall, if the first register contains invalid data and the second register contains valid data, blocking the clock signal to the first register, which causes the invalid data in the first register to be replaced by valid data that is based in part on the valid data in the second register, wherein blocking the clock signal to the first register causes the first register to consume less power, thereby reducing the power consumption of the pipeline.

7. The computer-readable storage medium of claim 6, wherein detecting the stall in the pipeline involves determining if a downstream memory device, such as, a First-In, First-Out (FIFO) buffer, is full.

8. The computer-readable storage medium of claim 6, wherein removing the bubble reduces latency of the pipeline and converts the pipeline into a FIFO like storage device.

9. The computer-readable storage medium of claim 6, wherein the method can save power by preventing bubbles from consuming switching power while propagating through the pipeline.

10. The computer-readable storage medium of claim 9, wherein the method prevents bubbles from propagating through the pipeline by manipulating clock signals to the registers.

11. An apparatus that removes a bubble from a pipeline, comprising:

a detection mechanism configured to detect a stall in a pipeline, which comprises a first register, a pipeline stage, and a second register, wherein an output of the second register is coupled to an input of the pipeline stage, and an output of the pipeline stage is coupled to an input of the first register, and wherein the first register and the second register advance data whenever a clock signal is provided to them;

a determination mechanism configured to determine whether the first register contains invalid data;

wherein the determination mechanism is additionally configured to determine whether the second register contains valid data; and a replacement mechanism, wherein during the stall, if the first register contains invalid data and the second register contains valid data, the replacement mechanism is configured to block the clock signal to the first register, which causes the invalid data in the first register to be replaced by valid data that is based in part on the valid data in the second register, wherein blocking the clock signal to the first register causes the first register to consume less power, thereby reducing the power consumption of the pipeline.

12. The apparatus of claim 11, wherein removing the bubble reduces latency of the pipeline and converts the pipeline into a FIFO like storage device.

* * * * *

UNITED STATES PATENT AND TRADEMARK OFFICE
CERTIFICATE OF CORRECTION

PATENT NO. : 7,653,807 B2  Page 1 of 1
APPLICATION NO. : 11/231111
DATED : January 26, 2010
INVENTOR(S) : Lofgren et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 633 days.

Signed and Sealed this

Twenty-third Day of November, 2010

David J. Kappos
*Director of the United States Patent and Trademark Office*